(12) United States Patent
Kousaka

(10) Patent No.: US 7,872,093 B2
(45) Date of Patent: Jan. 18, 2011

(54) METHOD FOR PRODUCING POLYTHIOURETHANE RESIN

(75) Inventor: Masahisa Kousaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 98 days.

(21) Appl. No.: 12/439,261

(22) PCT Filed: Aug. 31, 2007

(86) PCT No.: PCT/JP2007/067019
§ 371 (c)(1),
(2), (4) Date: Apr. 7, 2009

(87) PCT Pub. No.: WO2008/026727
PCT Pub. Date: Mar. 6, 2008

(65) Prior Publication Data
US 2009/0259001 A1    Oct. 15, 2009

(30) Foreign Application Priority Data
Aug. 31, 2006   (JP)   ............... 2006-236358

(51) Int. Cl.
*C08G 75/04* (2006.01)
(52) U.S. Cl. ............... 528/374; 528/390; 528/487; 525/452; 525/535; 548/325.1
(58) Field of Classification Search ............... 525/452, 525/535; 528/374, 390, 487; 548/325.1
See application file for complete search history.

(56) References Cited

U.S. PATENT DOCUMENTS

| 5,068,445 A | 11/1991 | Arretz |
| 5,961,889 A | 10/1999 | Jiang et al. |
| 2002/0022713 A1 | 2/2002 | Tanaka et al. |
| 2004/0138401 A1 | 7/2004 | Bojkova et al. |
| 2005/0062932 A1 | 3/2005 | Kosaka et al. |
| 2006/0149018 A1 | 7/2006 | Kitahara |

FOREIGN PATENT DOCUMENTS

| JP | 2 6465 | 1/1990 |
| JP | 3 236386 | 10/1991 |
| JP | 7 118263 | 5/1995 |
| JP | 7 118390 | 5/1995 |
| JP | 10-120676 | * 5/1998 |
| JP | 10 120676 | 5/1998 |
| JP | 2001 342172 | 12/2001 |
| JP | 3415389 | 6/2003 |
| JP | 2005 121679 | 5/2005 |
| JP | 2005 281527 | 10/2005 |
| JP | 2006 509901 | 3/2006 |
| WO | 2004 108787 | 12/2004 |

* cited by examiner

*Primary Examiner*—David Wu
*Assistant Examiner*—Robert Jones, Jr.
(74) *Attorney, Agent, or Firm*—Oblon, Spivak, McClelland, Maier & Neustadt, L.L.P.

(57) ABSTRACT

A process for producing a polythiourethane resin which comprises (A) a step of synthesizing a polythiol oligomer having disulfide bond by reaction of a polythiol compound having a functionality of two or greater and sulfur and (B) a step of bringing the polythiol oligomer obtained in step (A) and a compound having poly(thio)isocyanate groups into reaction with each other, wherein step (A) is conducted in the absence of solvents using no catalysts or a catalyst substantially inert to the compound having poly(thio)isocyanate groups. A polythiol oligomer exhibiting a greater refractive index than that of the polythiol compound having a functionality of two or greater used as the starting material is produced at a low cost, and a process for producing a practically useful polythiourethane resin exhibiting a stable great refractive index and a great Abbe number is provided.

9 Claims, No Drawings

US 7,872,093 B2

METHOD FOR PRODUCING POLYTHIOURETHANE RESIN

TECHNICAL FIELD

The present invention relates to a process for producing a polythiourethane resin and, more particularly, to a process for producing a polythiourethane resin exhibiting advantageous optical properties as the material for optical uses using a polythiol oligomer having disulfide bond as the raw material. The polythiourethane resin obtained in accordance with the process of the present invention is advantageously used, for example, for optical lenses, spectacle lenses, contact lenses, intraocular lenses, prisms, optical filters, optical fibers and optical disk substrates.

BACKGROUND ART

Plastic lenses are used for optical members such as various lenses since plastic lenses have light weight, are not easily broken and can be easily dyed. Examples of the practically used plastic material for optical uses include poly(diethylene glycol bisallycarbonate), polymethyl meth-acrylate and polycarbonates.

In general, an optical material such as a transparent glass or plastics exhibits a smaller Abbe number when the material exhibits a greater refractive index, and vice versa. Therefore, it is very difficult that a plastics material for optical uses exhibiting both of a great refractive index and a great Abbe number is produced.

To overcome the above problem, as the plastic lens exhibiting both of a great refractive index and a great Abbe number, a polythiourethane lens which is obtained by the reaction of a polythiol comprising dimercaptomethyl-1,4-dithiane (hereinafter, referred to as DMMD) and a polyisocyanate, is disclosed (refer to Patent Reference 1). Since DMMD used as the material monomer for producing the polythiourethane lens described in Patent Reference 1 exhibits a refractive index as great as 1.646 and an Abbe number as great as 35.2, the obtained polythiourethane lens exhibits both of a great refractive index and a great Abbe number. However, a plastic lens exhibiting a still greater refractive index and greater Abbe number has been desired.

In response to the above desire, processes for producing a polythiourethane lens in which DMMD is oxidized with the air in the presence of a catalyst such as methyl sulfoxide and ferric chloride to obtain a mixture of oligomers of DMMD, and the polythiourethane lens is produced by the reaction of the mixture of oligomers of DMMD with a polyisocyanate, are proposed (refer to Patent References 2 and 3). In accordance with the above processes, a problem arises in that a step of removing a solvent is required and a step of isolation and purification is further required where necessary, and it is difficult that a polythiourethane material exhibiting constant refractive index and Abbe number is obtained.

A process for producing a polythiol oligomer in which a polythiol having a functionality of two or greater and sulfur are brought into reaction with each other in the presence of a basic catalyst comprising ammonia or an amine as the oligomerization catalyst, is proposed (refer to Patent Reference 4). However, a solvent is used in the process disclosed in the example described in Patent Reference 4, and a step of removing the solvent is necessary. Moreover, when a polymer for the material for optical uses is produced by bringing the obtained polythiol oligomer into reaction with a compound having poly(thio)isocyanate groups, the oligomerization catalyst described above markedly reacts with the compound having poly(thio)isocyanate groups, and a white cloudy product or a coagulated product is formed. Therefore, a problem arises in that the step of removing the catalyst is necessary, and it is difficult that a polymer for the material for optical uses exhibiting uniform refractive index and Abbe number is obtained.

[Patent Reference 1] Japanese Patent Application Laid-Open No. Heisei 3 (1991)-236386

[Patent Reference 2] Japanese Patent Application Laid-Open No. Heisei 7 (1995)-118263

[Patent Reference 3] Japanese Patent Application Laid-Open No. Heisei 7 (1995)-118390

[Patent Reference 4] Japanese Patent No. 3415389

DISCLOSURE OF THE INVENTION

The present invention has been made to overcome the above problems and has an object of providing a process for producing a polythiol oligomer exhibiting a greater refractive index and a greater Abbe number than that of the polythiol compound having a functionality of two or greater used as the raw material at a low cost, and efficiently producing a practically useful polythiourethane resin exhibiting a great refractive index and a great Abbe number with stability using the produced polythiol oligomer as the raw material.

As the result of extensive studies by the present inventors, it was found that the above object could be achieved by synthesizing a polythiol oligomer by the reaction of a polythiol compound having a functionality of two or greater and sulfur in the absence of solvents using no catalysts or a specific catalyst, followed by bringing the obtained oligomer into reaction with a compound having poly(thio)isocyanate groups. The present invention has been completed based on the knowledge.

The present invention provides a process for producing a polythiourethane resin as shown in (1) to (9) in the following.

(1) A process for producing a polythiourethane resin which comprises (A) a step of synthesizing a polythiol oligomer having disulfide bond by reaction of a polythiol compound having a functionality of two or greater and sulfur and (B) a step of bringing the polythiol oligomer obtained in step (A) and a compound having poly(thio)isocyanate groups into reaction with each other, wherein step (A) is conducted in absence of solvents using no catalysts or a catalyst substantially inert to the compound having poly(thio)isocyanate groups;

(2) A process for producing a polythiourethane resin described in (1), wherein solubility of sulfur is 1 g or greater per 100 g of the polythiol compound having a functionality of two or greater at 80° C.;

(3) A process for producing a polythiourethane resin described in (1) or (2), wherein the polythiol compound having a functionality of two or greater is a polythiol compound comprising at least one compound selected from 2,5-bis(mercaptomethyl)-1,4-dithiane, 1,2,3-trimercapto-propane, bis(mercaptoethyl)sulfide, bis(mercaptoethyl)disulfide and 1,2-bis(mercaptoethylthio)-3-mercaptopropane;

(4) A process for producing a polythiourethane resin described in any one of (1) to (3), wherein the compound having poly(thio)isocyanate groups is at least one compound selected from bis((thio)isocyanatomethyl)-bicyclo(2.2.1)heptane, bis((thio)isocyanatomethyl)cyclohexane, isophorone di(thio)isocyanate, hexamethylene di(thio)isocyanate, dicyclohexyl-methane di(thio)isocyanate, bis((thio)isocyanatomethyl)-1,4-dithiane and xylylene di(thio)isocyanate;

(5) A process for producing a polythiourethane resin described in any one of (1) to (4), wherein relative amounts of the polythiol compound having a functionality of two or greater and sulfur (S) are such that a ratio of amounts by mole equivalent of mercapto group in the polythiol compound having a functionality of two or greater to S/2 is in a range of 1:0.01 to 1:0.5;

(6) A process for producing a polythiourethane resin described in any one of (1) to (5), wherein the catalyst substantially inert to the compound having poly(thio)isocyanate groups is a phosphorus catalyst or an imidazole-based catalyst;

(7) A process for producing a polythiourethane resin described in (6), wherein the phosphorus catalyst is at least one compound selected from compounds represented by following general formula (I):

$$[R^1_4—P(O)]X \qquad (I)$$

wherein $R^1$ represents an alkyl group having 1 to 4 carbon atoms, X represents a halogen atom, and a plurality of $R^1$ may represent same group or different groups;

(8) A process for producing a polythiourethane resin described in (6), wherein the imidazole-based catalyst is at least one compound selected from compounds represented by following general formula (II):

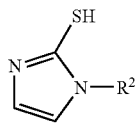

(II)

wherein $R^2$ represents an alkyl group having 1 to 4 carbon atoms; and (9) A process for producing a polythiourethane resin described in any one of (1) to (8), wherein, in step (A), degassing is conducted during the reaction is conducted or after the reaction is completed.

In accordance with the process of the present invention, a process for producing a polythiol oligomer exhibiting a greater refractive index than that of the polythiol compound having a functionality of two or greater used as the raw material at a low cost, and efficiently producing a practically useful polythiourethane resin exhibiting a great refractive index and a great Abbe number with stability using the produced polythiol oligomer as the raw material, can be provided.

THE MOST PREFERRED EMBODIMENT TO CARRY OUT THE INVENTION

The process for producing a polythiourethane resin of the present invention comprises (A) a step of synthesizing a polythiol oligomer having disulfide bond by the reaction of a polythiol compound having a functionality of two or greater and sulfur and (B) a step of bringing the polythiol oligomer obtained in step (A) and a compound having poly(thio)isocyanate groups into reaction with each other.

Step (A) described above will be described in the following.

Step (A) is characterized in that a polythiol oligomer having disulfide bond is synthesized by the reaction of a polythiol compound having a functionality of two or greater and sulfur in the absence of solvents using no catalysts or a catalyst substantially inert to the compound having poly(thio)isocyanate groups.

The reaction in step (A) is conducted in the absence of solvents. Due to this condition, a step for removing solvents is not necessary after the reaction is completed in step (A), and step (B) described below can be conducted continuously after step (A).

In step (A), a polythiol compound having a functionality of two or greater is used as a raw material. The polythiol compound having a functionality of two or greater may be any of straight chain, branched chain and cyclic compounds. The polythiol compound may have other functional groups such as groups having active hydrogen atom, examples of which include amine group and hydroxyl group, as long as the compound has at least two mercapto groups (—SH).

Examples of the polythiol compound having functionality of two or greater include 2,5-bis(mercaptomethyl)-1,4-dithiane, pentaerythritol tetrakismercaptoacetate, pentaerythritol tetrakismercaptopropionate, trimethylolpropane trismercaptoacetate, trimethylolpropane trismercarptopropionate, 1,2,3-trimercaptopropane, 2,3-dimercapto-1-propanol, bis(mercaptoethyl)sulfide, bis(mercaptoethyl)disulfide and 1,2-bis(mercaptoethylthio)-3-mercaptopropane. The above compound may be used singly or in combination of two or more.

Among these compounds, compounds having a solubility of sulfur of 1 g or greater per 100 g of the polythiol compound having a functionality of two or greater at 80° C. are preferable. When the solubility of sulfur is 1 g or greater, the oligomerization proceeds sufficiently in the absence of solvents. A polythiol showing difficulty in dissolving sulfur may be used in combination so that physical properties such as heat resistance and processability can be improved. From the above standpoint, it is preferable that the solubility of sulfur is 3 g or greater.

Examples of the polythiol compound having a functionality of two or greater and the solubility of sulfur described above include 2,5-bis(mercaptomethyl)-1,4-dithiane, 1,2,3-trimercaptopropane, bis-(mercaptoethyl)sulfide, bis(mercaptoethyl)disulfide and 1,2-bis-(mercapto ethylthio)-3-mercaptopropane.

The polythiol compound may be used singly or in combination of two or more and may be a mixture comprising other polythiol compounds having a functionality of two or greater. When two or more polythiol compounds having a functionality of two or greater are used in combination, it is sufficient that the solubility of sulfur per 100 g of the mixture of the polythiol compounds at 80° C. is within the range described above. From the standpoint of obtaining a great refractive index and a great Abbe number, for example, the combination of pentaerythritol tetrakismercaptoacetate and 2,5-bis(mercaptomethyl)-1,4-dithiane, the combination of pentaerythritol tetrakismercaptoacetate and bis(mercapto-ethyl) sulfide, the combination of 1,2-bis(mercaptoethylthio)-3-mercaptopropane and 2,5-bis(mercaptomethyl)-1,4-dithiane and the combination of 1,2-bis(mercaptoethylthio)-3-mercaptopropane and bis(mercaptoethyl) sulfide are preferable.

In step (A), a polythiol oligomer is formed by the reaction of the polythiol compound having a functionality of two or greater described above and sulfur. For example, when the oligomer formed by the reaction is a dimer, the reaction of the polythiol having a functionality of two or greater and sulfur can be expressed by the following equation:

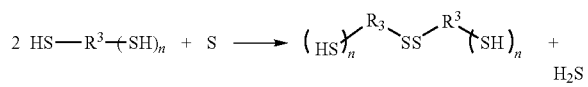

$$H_2S$$

In the above equation, $R^3$ represents an organic group, and n represents an integer of 1 or greater and preferably 1, 2 or 3.

As the relative amounts of the polythiol compound having a functionality of two or greater and sulfur (S), it is preferable that the ratio of the amounts by mole equivalent of mercapto group in the polythiol compound having a functionality of two or greater to S/2 is in the range of 1:0.01 to 1:0.5. When the relative amount of S/2 by mole equivalent is 0.01 or greater, the conversion of the polythiol compound is increased, and the effect of increasing the refractive index of the obtained resin is exhibited. When the relative amount of S/2 by mole equivalent is 0.5 or smaller, the amount of formation of multimers having great molecular weights which are not preferable as the raw material for the polythiourethane resin can be suppressed, and the workability is excellent since fluidity can be maintained. From the above standpoint, it is more preferable that the ratio of the amounts by mole equivalent of mercapto group in the polythiol compound having a functionality of two or greater to S/2 is in a range of 1:0.1 to 1:0.5.

Sulfur described above may have any desired form and may be any of crystalline sulfur, colloidal sulfur, powder sulfur and flower of sulfur. It is preferable that sulfur having a purity of 98% or greater and more preferably 99% or greater is used.

In step (A), no catalysts are used, or a catalyst substantially inert to the compound having poly(thio)isocyanate groups is used.

The reaction in step (A) proceeds in the absence of catalysts. When a catalyst is used, a catalyst substantially inert to the compound having poly(thio)isocyanate groups described below is selected. In accordance with a conventional process, for example, the basic catalyst comprising ammonia or an amine described in Patent Reference 4 reacts markedly with the compound having poly(thio)isocyanate groups, and the viscosity is increased, for example, to a value exceeding 0.5 Pa·s within 2 hours to form a white cloudy product or a coagulated product. Therefore, it is necessary that step (B) be conducted after the catalyst is removed.

In contrast, in accordance with the process of the present invention, step (B) can be conducted continuously after step (A) without necessity for the step of removing the catalyst, and the object product can be obtained without side reactions with the catalyst in step (B).

Examples of the catalyst substantially inert to the compound having poly(thio)isocyanate groups include phosphorus catalysts and imidazole-based catalysts. The catalyst substantially inert to the compound having poly(thio)isocyanate groups includes catalysts which react with the compound having poly(thio)isocyanate groups as long as the object of the present invention is not adversely affected.

As the phosphorus catalyst, catalysts represented by the following general formula (I) are preferable:

[R$^1_4$—P(O)]X     (I)

wherein $R^1$ represents an alkyl group having 1 to 4 carbon atoms, X represents a halogen atom, and a plurality of $R^1$ may represent the same group or different groups. The alkyl group may be a straight chain group or a branched chain group.

As the halogen atom, chlorine atom and bromine atom are preferable.

Specific examples of the phosphorus catalyst include tetramethylphosphonium bromide, tetraethylphosphonium bromide, tetrapropylphosphonium bromide, tetrabutylphosphonium bromide, tetramethylphosphonium chloride, tetraethylphosphonium chloride, tetrapropylphosphonium chloride and tetrabutylphosphonium chloride.

As the imidazole-based catalyst, catalysts represented by the following general formula (II) are preferable:

(II)

wherein $R^2$ represents an alkyl group having 1 to 4 carbon atoms. The alkyl group may be a straight chain group or a branched chain group.

Specific examples of the imidazole-based catalyst include 2-mercapto-1-methylimidazole, 2-mercapto-1-ethylimidazole, 2-mercapto-1-propylimidazole and 2-mercapto-1-butylimidazole.

The amount of the above catalysts is, in general, in the range of 0.01 to 0.50% by mass and preferably in the range of 0.05 to 0.30% by mass based on the amount of the thiol compound.

The basic catalyst comprising an amine which is described in Patent Reference 4 as the catalyst reacting with the compound having poly(thio)isocyanate groups may be added where necessary as long as the basic catalyst does not adversely affect the object of the present invention. Specifically, the basic catalyst comprising an amine can be added as long as the increase in the viscosity or the formation of a white cloudy product or a coagulated product does not take place due to the reaction with the compound having poly(thio)isocyanate groups. It is preferable that the amount of the basic catalyst is 0.0001% by mole or smaller based on the amount of the thiol compound.

The temperature of the reaction in step (A) is not particularly limited as long as sulfur is dissolved into the polythiol compound having a functionality of two or greater. The temperature is, in general, 30 to 80° C. and preferably 40 to 60° C.

The time of the reaction in step (A) is different depending on various conditions such as the type of the raw materials, the relative amounts of the polythiol compound and sulfur, the absence or the presence of the catalyst, the amount of the catalyst and the temperature of the reaction and cannot be generally decided. It is advantageous that the reaction is conducted until substantially no unreacted sulfur is left remaining.

In step (A), it is preferable that degassing is conducted while the reaction is conducted or after the reaction is completed so that hydrogen sulfide generated by the reaction is removed. By removing hydrogen sulfide, the reaction takes place without deviation of the relative amounts by equivalent of the functional groups, i.e., iso(thio)cyanate group and mercapto group, from the original calculated values in step (B) described below. Therefore, bubbles are not formed in the polythiourethane resin of the object product, and formation of fragile resins by the reaction of hydrogen sulfide and the compound having iso(thio)cyanate groups can be prevented. By removing hydrogen sulfide, oligomerization proceeds until no unreacted sulfur is left remaining, and separation of sulfur and whitening can be prevented in step (B) described below.

The polythiol oligomer formed as described above is an oligomer or a mixture of oligomers which contains at least one of the dimer, the trimer and the tetramer and may contain the unreacted polythiol compound. Therefore, in general, the reaction fluid contains the unreacted polythiol compound and a plurality of types of oligomers.

The obtained polythiol oligomer is substantially constituted with compound having two or more mercapto groups alone and contains compounds having disulfide bond in the molecule. Therefore, a product having a refractive index greater than that of the polythiol compound having a functionality of two or greater used as the raw material is obtained by suitably deciding the condition of the reaction. In accordance with the process of step (A) described above, the polythiol oligomer as the raw material in step (B) described in the following can be produced at a low cost.

Step (B) will be described in the following.

Step (B) is a step in which the polythiol oligomer obtained in step (A) and the compound having poly(thio)isocyanate groups are brought into reaction with each other, and a polythiourethane resin is produced.

In the process of the present invention, the step for removing solvents and catalysts are not necessary after step (A) as described above, and step (B) can be conducted continuously in the same reactor used in step (A). Therefore the polythiourethane resin can be produced efficiently.

In step (B), as a raw material the reaction fluid of the polythiol oligomer obtained in step (A) can be used without isolating and purifying the product. The reaction fluid contains at least one of the dimer, the trimer and the tetramer of the polythiol compound having a functionality of two or greater and may contain the unreacted polythiol compound.

The compound having poly(thio)isocyanate groups means a compound having polyisocyanate groups or a compound having polythioisocyanate groups, i.e., a compound having two or more isocyanate groups (—NCO) or thioisocyanate groups (—NCS). It is sufficient that the compound having poly(thio)isocyanate groups is a compound which can be used in the field of the material for optical uses, and the type of the compound is not particularly limited. In general, it is preferable that a compound having poly(thio)isocyanate groups has a small viscosity since, in general, the viscosity of polythiol oligomers is relatively great.

Specific examples of the compound having poly(thio)isocyanate groups which can be used in the present invention include compound having polyisocyanate groups such as bis(isocyanatomethyl)bicyclo(2.2.1)-heptane, bis(isocyanatomethyl)cyclohexane, isophorone diisocyanate, hexamethylene diisocyanate, dicyclohexylmethane diisocyanate, bis(isocyanatomethyl)-1,4-dithiane and xylylene diisocyanate and compounds having polythioisocyanate groups corresponding to the compounds having polyisocyanate groups. Among these compounds, compounds having polyisocyanate groups are preferable, and bis(isocyanatomethyl)bicyclo(2.2.1)heptane, bis(isocyanatomethyl)cyclohexane, isophorone diisocyanate and xylylene diisocyanate are more preferable from the standpoint of transparency, heat resistance and weatherability of the resin.

When the step of removing solvents and catalysts used for the oligomerization is necessary as described above for the conventional process for producing a polythiourethane resin, the amounts of the unreacted polythiol compound and other compounds contained in the mixture of polythiol oligomers are decreased occasionally in the above step. Therefore, a problem arises in that the amount of the compound having poly(thio)isocyanate groups used for the reaction must be changed depending on the degree of the loss of mercapto group contained in the mixture of polythiol oligomers when the reaction for forming the urethane with the compound having poly(thio)isocyanate groups is conducted after the above step, and it is difficult that a polythiourethane resin exhibiting constant values of the refractive index and the Abbe number is obtained.

In contrast, in accordance with the process of the present invention, the amount of the compound having poly(thio)isocyanate groups used for the reaction can be easily decided stoichiometrically based on the relative amounts of mercapto group in the polythiol compound and sulfur described above without consideration on the loss of the mercapto group described above.

As the relative amount of the compound having poly(thio)isocyanate groups, it is preferable that the ratio of the amounts by equivalent of mercapto group in the mixture of polythiol oligomers obtained in step (A) to the functional group in the compound having poly(thio)isocyanate groups is in the range of 1:0.9 to 1:1.1. When the relative amount by equivalent of the functional group in the compound having poly(thio)isocyanate groups is 0.9 or greater, excellent heat resistance can be obtained although the heat resistance may be different depending on the combination of the used raw materials for the polymerization A mercaptan odor can be prevented at the time of cutting processing of the resin. When the relative amount by equivalent of the functional group in the compound having poly(thio)isocyanate groups is 1.1 or smaller, excellent weatherability can be obtained without yellowing of the resin obtained after the polymerization. From the above standpoint, it is more preferable that the ratio of the amounts by equivalent of mercapto group in the mixture of polythiol oligomers obtained in step (A) to the functional group in the compound having poly(thio)isocyanate groups is in the range of 1:0.95 to 1:1.05.

In step (B), components other than the above components such as UV absorbents, antioxidants and dyes can be suitably added where necessary.

In step (B), the polythiourethane resin can be produced by preparing a mixture comprising the polythiol oligomer obtained in step (A), the compound having poly(thio)isocyanate groups and the components added where necessary, followed by polymerization in accordance with a conventional process such as the thermal polymerization and the photopolymerization in the presence of a polymerization catalyst in a suitable amount. The condition of the polymerization is not particularly limited, and the polymerization can be conducted under the condition conventionally applied in the field of the material for optical uses. Examples of the polymerization catalyst include organotin compounds such as dimethyltin dichloride.

The production of an article for optical uses comprising the polythiourethane resin produced as described above can be conducted in accordance with the casting (casting polymerization) process, the grinding and polishing process and the injection molding process. When the product is produced in accordance with the casting (casting polymerization) process, an internal mold release agent may be mixed into the raw material mixture for the polymerization, occasionally.

The polythiourethane resin produced in accordance with the process of the present invention exhibits both of the great refractive index and the great Abbe number (the small dispersing property), and the refractive index and the Abbe number are kept constant among the lots of products. Therefore, the resin can be advantageously used as the material for articles for optical uses such as optical lenses, spectacle lenses, prisms, optical fibers, substrates for recording information, coloring filters and filters for absorbing infrared ray.

EXAMPLES

The present invention will be described more specifically with reference to examples in the following. However, the present invention is not limited to the examples. Physical properties were measured in accordance with the following methods.

(1) Appearance

Transparency of an obtained polythiourethane resin was examined by visual observation.

(2) Refractive Indices and Abbe Numbers

The refractive indices (nd, ne) and the Abbe numbers (vd, ve) of the obtained polythiourethane resin were measured using a precision refractometer KPR-200 manufactured by SHIMADZU DEVICE Corporation.

Example 1

2,5-bis(mercaptomethyl)-1,4-dithiane in an amount of 31.80 parts by mass and 21.60 parts by mass of pentaerythritol tetrakismercapto-acetate as the polythiol compound and 0.80 parts by mass of sulfur were weighed, and sulfur was dissolved at 80° C. under stirring. The obtained solution which was initially colored yellow was discolored gradually to produce a transparent solution while hydrogen sulfide was generated, and the reaction proceeded. After 60 minutes, generation of hydrogen sulfide ceased to be observed, and the solution became transparent. Then, the obtained solution was cooled at the room temperature and stirred under a reduced pressured of 133 mPa to remove hydrogen sulfide dissolved in the polythiol compound, and a mixture of polythiol oligomers (containing unreacted compounds) was obtained.

Separately, 46.40 parts by mass of bis(isocyanatomethyl) bicyclo-(2.2.1)heptane as the compound having polyisocyanate groups, 0.10 parts by mass of SEESORB 707 manufactured by SHIPRO KASEI KAISHA Ltd. as the UV absorbent, 0.15 parts by mass of an acid phosphate ester (the trade name: JP506H; manufactured by JOHOKU CHEMICAL Co., Ltd.) as the internal mold release agent and 0.10 parts by mass of dimethyltin dichloride as the polymerization catalyst were mixed, and a solution was obtained under stirring. The obtained solution was added to and mixed with the mixture of polythiol oligomers (containing unreacted compounds) obtained above. The resultant mixture was degassed under stirring under 133 mPa for 15 minutes, filtered through a filter of polytetra fluoroethylene (PTFE) (the diameter of pores: 5 μm) and cast into a mold for spectacle lenses. The mixture in the mold was polymerized by slowly heating from about 10° C. to about 120° C. over 24 hours in a manner such that striae were not formed, and a polythiourethane resin having the shape of a lens was obtained. The appearance, the refractive indices and the Abbe numbers of the obtained resin are shown in Table 1.

Examples 2 to 14

Lenses were prepared in accordance with the same procedures as those conducted in Example 1 except that polythiol compounds and compounds having polyisocyanate groups shown in Tables 1 and 2 were used. The appearance, the refractive indices and the Abbe numbers of the obtained resins are shown in Tables 1 and 2.

Example 15

A mixture of polythiol oligomers (containing unreacted compounds) was obtained in accordance with the same procedures as those conducted in Example 1 except that the polythiol compound shown in Table 2, sulfur and 0.02 parts by mass of tetrabutylphosphonium bromide as the oligomerization catalyst were weighed, and sulfur was dissolved at 80° C. under stirring.

Then, a lens was prepared in accordance with the same procedures as those conducted in Example 1 except that the compound having polyisocyanate groups shown in Table 2 was used. The appearance, the refractive indices and the Abbe numbers of the obtained resin are shown in Table 2.

Example 16

A mixture of polythiol oligomers (containing unreacted compounds) was obtained in accordance with the same procedures as those conducted in Example 1 except that the polythiol compound shown in Table 2, sulfur and 0.03 parts by mass of 2-mercapto-1-methylimidazole as the oligomerization catalyst were weighed, and sulfur was dissolved at 80° C. under stirring.

Then, a lens was prepared in accordance with the same procedures as those conducted in Example 1 except that the compound having polyisocyanate groups shown in Table 2 was used. The appearance, the refractive indices and the Abbe numbers of the obtained resin are shown in Table 2.

Example 17

2,5-bis(Mercaptomethyl)-1,4-dithiane in an amount of 37.01 parts by mass, 26.88 parts by mass of bis(mercaptoethyl) sulfide and 32.32 parts by mass of pentaerythritol tetrakismercaptoacetate as the polythiol compound and 3.78 parts by mass of sulfur were weighed, and sulfur was dissolved at 60° C. under stirring. The obtained solution which was initially colored yellow was discolored gradually to produce a transparent solution while hydrogen sulfide was generated, and the reaction proceeded. After about 24 hours, it was confirmed that generation of hydrogen sulfide almost ceased to be observed. Then, the obtained solution was kept at 50° C. and stirred under a reduced pressured of 133 mPa to remove hydrogen sulfide dissolved in the polythiol compound, and a mixture of polythiol oligomers was obtained.

Separately, 46.85 parts by mass of isophorone diisocyanate as the compound having polyisocyanate groups, 1.0 part by mass of SEESORB 707 manufactured by SHIPRO KASEI KAISHA Ltd. as the ultraviolet light absorbent, 0.18 parts by mass of an acid phosphate ester (the trade name: JP506H; manufactured by JOHOKU CHEMICAL Co., Ltd.) as the internal mold release agent and 0.40 parts by mass of dimethyltin dichloride as the polymerization catalyst were mixed, and a solution was obtained under stirring. The mixture of polythiol oligomers obtained above in an amount of 53.15 parts by mass was added to and mixed with the obtained solution. The resultant mixture was degassed under stirring under 133 mPa for 45 minutes, filtered through a filter of polytetrafluoroethylene (PTFE) (the diameter of pores: 5 μm) and cast into a mold for spectacle lenses. The mixture in the mold was polymerized by slowly heating from about 10° C. to about 130° C. over 24 to 48 hours in a manner such that striae were not formed, and a polythiourethane resin having the shape of a lens was obtained. The appearance, the refractive indices and the Abbe numbers of the obtained resin are shown in Table 3.

Example 18

A mixture of polythiol oligomers was obtained in accordance with the same procedures as those conducted in Example 17.

Then, a polythiourethane resin having the shape of a lens was obtained in accordance with the same procedures as those conducted in Example 17 except that 38.85 parts by mass of isophorone diisocyanate and 6.10 parts by mass of hexamethylene diisocyanate as the compound having polyisocyanate groups and 55.05 parts by mass of the mixture of polythiol oligomers obtained above were used. The appearance, the refractive indices and the Abbe numbers of the obtained resin are shown in Table 3.

Comparative Example 1

2,5-bis(Mercaptomethyl)-1,4-dithiane as the polythiol compound in an amount of 26.50 parts by mass and 27.00 parts by mass of pentaerythritol tetrakismercaptoacetate were weighed and mixed.

Separately, 51.50 parts by mass of bis(isocyanatomethyl)bicyclo-(2.2.1)heptane as the compound having polyisocyanate groups, 0.10 parts by mass of SEESORB 707 manufactured by SHIPRO KASEI KAISHA Ltd. as the UV absorbent, 0.15 parts by mass of an acid phosphate ester (the trade name: JP506H; manufactured by JOHOKU CHEMICAL Co., Ltd.) as the internal mold release agent and 0.10 parts by mass of dimethyltin dichloride as the polymerization catalyst were mixed, and a solution was obtained under stirring. The obtained solution was added to and mixed with the mixture obtained above. The resultant mixture was degassed under stirring under 133 mPa for 15 minutes, filtered through a filter of PTFE (the diameter of pores: 5 μm) and cast into a mold for spectacle lenses. The mixture in the mold was polymerized by slowly heating from about 10° C. to about 120° C. over 24 hours in a manner such that striae were not formed, and a polythiourethane resin having the shape of a lens was obtained. The appearance, the refractive indices and the Abbe numbers of the obtained resin are shown in Table 2.

Comparative Example 2

2,5-bis(Mercaptomethyl)-1,4-dithiane in an amount of 53.00 parts by mass and 54.00 parts by mass of pentaerythritol tetrakismercapto-acetate as the polythiol compound, 16.00 parts by mass of sulfur, 0.0146 parts by mass of diethylamine as the catalyst and 84.55 parts by mass of tetrahydrofuran (THF) as the solvent were placed into a reactor, and the obtained mixture was heated at 60° C. under stirring. Bubbles of hydrogen sulfide were generated, and the generation of bubbles began to decrease after 30 minutes. When the generation of bubbles stopped completely, THF was removed by elevating the temperature at 100° C. After the treatment under a reduced pressure of 133 mPa for 30 minutes, a mixture of polythiol oligomers (containing unreacted compounds; Mixture A) was obtained. Mixture A in an amount of 53.50 parts by mass was placed into a beaker. Separately, 42.30 parts by mass of xylylene diisocyanate as the compound having polyisocyanate groups, 0.10 parts by mass of SEESORB 707 manufactured by SHIPRO KASEI KAISHA Ltd. as the UV absorbent, 0.15 parts by mass of an acid phosphate ester (the trade name: JP506H; manufactured by JOHOKU CHEMICAL Co., Ltd.) as the internal mold release agent and 0.02 parts by mass of dimethyltin dichloride as the polymerization catalyst were mixed, and a solution was obtained under stirring. The obtained solution was added to and mixed with Mixture A in the beaker described above. The resultant mixture was degassed under stirring under 133 mPa for 15 minutes, filtered through a filter of PTFE (the diameter of pores: 5 μm) and cast into a mold for spectacle lenses. During the casting, the raw materials contained in the mixture generated heat gradually, and the operation was stopped when the casting became difficult.

The obtained lens showed unevenness which appeared to be formed by convection and formation of bubbles. The obtained resin was not a uniform transparent resin, and the optical properties could not be obtained.

TABLE 1

|  | Example | | | | |
| --- | --- | --- | --- | --- | --- |
|  | 1 | 2 | 3 | 4 | 5 |
| Polythiol compound (SH) | | | | | |
| 2,5-bis(mercaptomethyl)-1,4-dithiane (difunctional) | 31.80 | 26.50 | 26.50 | — | — |
| bis(mercaptoethyl) sulfide (difunctional) | — | — | — | 15.40 | 19.30 |
| 1,2-bis(mercaptoethylthio)-3-mercaptopropane (trifunctional) | — | — | — | — | — |
| pentaerythritol tetrakismercapto-acetate (tetrafunctional) | 21.60 | 27.00 | 27.00 | 32.40 | 27.00 |
| difunctional/tetrafunctional (ratio of amounts by equivalent) | 0.6/0.4 | 0.5/0.5 | 0.5/0.5 | 0.4/0.6 | 0.5/0.5 |
| Sulfur (S) | 0.80 | 0.80 | 0.80 | 0.80 | 0.80 |
| Oligomerization catalyst | | | | | |
| tetrabutylphosphonium bromide | — | — | — | — | — |
| 2-mercapto-1-methylimidazole | — | — | — | — | — |
| Polyisocyanate compound (NCO) | | | | | |
| bis(isocyanatomethyl)bicyclo(2.2.1)-heptane | 46.40 | 46.40 | — | 46.40 | — |
| bis(isocyanatomethyl)cyclohexane | — | — | 43.70 | — | 43.70 |
| xylylene diisocyanate | — | — | — | — | — |
| isophorone diisocyanate | — | — | — | — | — |

TABLE 1-continued

|  | | | | | |
|---|---|---|---|---|---|
| Polymerization catalyst | | | | | |
| dimethyltin dichloride | 0.10 | 0.10 | 0.10 | 0.10 | 0.10 |
| Ratio of amounts | | | | | |
| NCO/SH/[S/2] [ratio of amounts by equivalent of functional groups] | 0.9/1/0.1 | 0.9/1/0.1 | 0.9/1/0.1 | 0.9/1/0.1 | 0.9/1/0.1 |
| Evaluation | | | | | |
| appearance | cl, tp | cl, tp | cl, tp | cl, tp | cl, tp |
| refractive index nd | 1.602 | 1.596 | 1.597 | 1.590 | 1.585 |
| refractive index ne | 1.606 | 1.600 | 1.600 | 1.594 | 1.588 |
| Abbe number νd | 41 | 42 | 41 | 41 | 42 |
| Abbe number νe | 41 | 41 | 41 | 41 | 42 |

|  | Example | | | | |
|---|---|---|---|---|---|
|  | 6 | 7 | 8 | 9 | 10 |
| Polythiol compound (SH) | | | | | |
| 2,5-bis(mercaptomethyl)-1,4-dithiane (difunctional) | — | — | 26.50 | — | — |
| bis(mercaptoethyl) sulfide (difunctional) | 15.40 | 23.10 | — | 19.30 | 15.40 |
| 1,2-bis(mercaptoethylthio)-3-mercaptopropane (trifunctional) | — | — | — | — | — |
| pentaerythritol tetrakismercapto-acetate (tetrafunctional) | 32.40 | 21.60 | 27.00 | 27.00 | 32.40 |
| difunctional/tetrafunctional (ratio of amounts by equivalent) | 0.4/0.6 | 0.6/0.4 | 0.5/0.5 | 0.5/0.5 | 0.6/0.4 |
| Sulfur (S) | 0.80 | 0.80 | 0.80 | 0.80 | 0.80 |
| Oligomerization catalyst | | | | | |
| tetrabutylphosphonium bromide | — | — | — | — | — |
| 2-mercapto-1-methylimidazole | — | — | — | — | — |
| Polyisocyanate compound (NCO) | | | | | |
| bis(isocyanatomethyl)bicyclo(2.2.1)-heptane | — | — | — | — | — |
| bis(isocyanatomethyl)cyclohexane | 43.70 | 43.70 | — | — | — |
| xylylene diisocyanate | — | — | 42.30 | 42.30 | — |
| isophorone diisocyanate | — | — | — | — | 50.13 |
| Polymerization catalyst | | | | | |
| dimethyltin dichloride | 0.10 | 0.10 | 0.02 | 0.02 | 0.02 |
| Ratio of amounts | | | | | |
| NCO/SH/[S/2] [ratio of amounts by equivalent of functional groups] | 0.9/1/0.1 | 0.9/1/0.1 | 0.9/1/0.1 | 0.9/1/0.1 | 0.9/1/0.1 |
| Evaluation | | | | | |
| appearance | cl, tp | cl, tp | ly, tp | ly, tp | cl, tp |
| refractive index nd | 1.581 | 1.583 | 1.632 | 1.627 | 1.564 |
| refractive index ne | 1.585 | 1.586 | 1.636 | 1.631 | 1.569 |
| Abbe number νd | 42 | 42 | 35 | 33 | 44 |
| Abbe number νe | 42 | 42 | 34 | 33 | 44 |

Notes
Amount of components:
part by mass Marks for the appearance:
cl, tp: colorless and transparent
ly, tp: light yellow and transparent

TABLE 2

|  | Example | | | |
|---|---|---|---|---|
|  | 11 | 12 | 13 | 14 |
| Polythiol compound (SH) | | | | |
| 2,5-bis(mercaptomethyl)-1,4-dithiane (difunctional) | — | — | — | — |
| bis(mercaptoethyl) sulfide (difunctional) | — | — | — | — |
| 1,2-bis(mercaptoethylthio)-3-mercaptopropane (trifunctional) | 43.35 | 43.35 | 43.35 | 43.35 |
| pentaerythritol tetrakismercapto- | — | — | — | — |

TABLE 2-continued

| | | | | |
|---|---|---|---|---|
| acetate (tetrafunctional) | | | | |
| difunctional/tetrafunctional (ratio of amounts by equivalent) | — | — | — | — |
| Sulfur (S) | 0.80 | 1.60 | 0.80 | 1.60 |
| Oligomerization catalyst | | | | |
| tetrabutylphosphonium bromide | — | — | — | — |
| 2-mercapto-1-methylimidazole | — | — | — | — |
| Polyisocyanate compound (NCO) | | | | |
| bis(isocyanatomethyl)bicyclo-(2.2.1)heptane | — | — | 46.35 | 41.20 |
| bis(isocyanatomethyl)cyclohexane | — | — | — | — |
| xylylene diisocyanate | 42.30 | 37.60 | — | — |
| isophorone diisocyanate | — | — | — | — |
| Polymerization catalyst | | | | |
| dimethyltin dichloride | 0.02 | 0.02 | 0.10 | 0.10 |
| Ratio of amounts | | | | |
| NCO/SH/[S/2] [ratio of amounts by equivalent of functional groups] | 0.9/1/0.1 | 0.8/1/0.2 | 0.9/1/0.1 | 0.8/1/0.2 |
| Evaluation | | | | |
| appearance | ly, tp | ly, tp | cl, tp | cl, tp |
| refractive index nd | 1.662 | 1.665 | 1.623 | 1.626 |
| refractive index ne | 1.667 | 1.670 | 1.627 | 1.631 |
| Abbe number vd | 31 | 31 | 38 | 38 |
| Abbe number ve | 31 | 31 | 38 | 38 |

| | Example | | Comparative Example | |
|---|---|---|---|---|
| | 15 | 16 | 1 | 2 |
| Polythiol compound (SH) | | | | |
| 2,5-bis(mercaptomethyl)-1,4-dithiane (difunctional) | 26.50 | — | 26.50 | |
| bis(mercaptoethyl) sulfide (difunctional) | — | 19.30 | — | |
| 1,2-bis(mercaptoethylthio)-3-mercaptopropane (trifunctional) | — | — | — | |
| pentaerythritol tetrakismercapto-acetate (tetrafunctional) | 27.00 | 27.00 | 27.00 | |
| difunctional/tetrafunctional (ratio of amounts by equivalent) | 0.5/0.5 | 0.5/0.5 | 0.5/0.5 | |
| Sulfur (S) | 0.80 | 0.80 | — | 53.50* |
| Oligomerization catalyst | | | | |
| tetrabutylphosphonium bromide | 0.02 | — | — | |
| 2-mercapto-1-methylimidazole | — | 0.03 | — | |
| Polyisocyanate compound (NCO) | | | | |
| bis(isocyanatomethyl)bicyclo-(2.2.1)heptane | 46.40 | — | 51.50 | — |
| bis(isocyanatomethyl)cyclohexane | — | 43.70 | — | — |
| xylylene diisocyanate | — | — | — | 42.30 |
| isophorone diisocyanate | — | — | — | — |
| Polymerization catalyst | 0.10 | 0.10 | 0.10 | 0.20 |
| dimethyltin dichloride | | | | |
| Ratio of amounts | | | | |
| NCO/SH/[S/2] [ratio of amounts by equivalent of functional groups] | 0.9/1/0.1 | 0.9/1/0.1 | 1/1/— | 0.9/1/0.05 |
| Evaluation | | | | |
| appearance | cl, tp | cl, tp | cl, tp | ly, ue-tp |
| refractive index nd | 1.596 | 1.585 | 1.593 | — |
| refractive index ne | 1.600 | 1.588 | 1.597 | — |
| Abbe number vd | 42 | 42 | 42 | — |
| Abbe number ve | 41 | 42 | 42 | — |

Notes
Amount of components: part by mass
Marks for the appearance:
cl, tp: colorless and transparent
ly, tp: light yellow and transparent
ly, ue-tp: light yellow, uneven and transparent
*the amount (part by mass) of Mixture A of polythiol oligomers containing the unreacted polythiol compound

TABLE 3

|  | Example | |
|---|---|---|
|  | 17 | 18 |
| Mixture of polythiol oligomers (part by mass) | 53.15 | 55.05 |
| Polyisocyanate compound (NCO) (part by mass) | | |
| isophorone diisocyanate | 46.85 | 38.85 |
| hexamethylene diisocyanate- | — | 6.10 |
| Polymerization catalyst (part by mass) | | |
| dimethyltin dichloride | 0.40 | 0.40 |
| Ratio of amounts | | |
| NCO/SH/[S/2] [ratio of amounts by equivalent of functional groups] | 0.763/1/0.237 | 0.763/1/0.237 |
| Evaluation | | |
| appearance | light yellow transparent | light yellow transparent |
| refractive index nd | 1.592 | 1.594 |
| refractive index ne | 1.596 | 1.597 |
| Abbe number νd | 40 | 40 |
| Abbe number νe | 40 | 40 |

INDUSTRIAL APPLICABILITY

In accordance with the process of the present invention, a polythiourethane resin exhibiting a great refractive index and a great Abbe number (a small dispersing property) and providing constant values of refractive index and Abbe number among lots of products can be produced efficiently. The polythiourethane resin is advantageously used as the material for optical uses such as optical lenses, spectacle lenses, prisms, optical fibers, substrates for recording information, coloring filters and filters for absorbing infrared ray.

The invention claimed is:

1. A process for producing a polythiourethane resin which comprises (A) synthesizing a polythiol oligomer having a disulfide bond by the reaction of a polythiol compound having a functionality of two or greater and sulfur and (B) bringing the polythiol oligomer obtained and a compound having poly(thio)isocyanate groups into reaction with each other, wherein the oligomer synthesis is conducted in the absence of solvents using no catalysts or a catalyst substantially inert to the compound having poly(thio)isocyanate groups.

2. The process for producing a polythiourethane resin according to claim 1, wherein the solubility of sulfur at 80° C. is 1 g or greater per 100 g of the polythiol compound having a functionality of two or greater.

3. The process for producing a polythiourethane resin according to claim 1, wherein the polythiol compound having a functionality of two or greater is a polythiol compound comprising at least one compound selected from the group consisting of 2,5-bis(mercaptomethyl)-1,4-dithiane, 1,2,3-trimercapto-propane, bis(mercaptoethyl)sulfide, bis(mercaptoethyl)disulfide and 1,2-bis(mercaptoethylthio)-3-mercaptopropane.

4. The process for producing a polythiourethane resin according to claim 1, wherein the compound having poly(thio)isocyanate groups is at least one compound selected from the group consisting of bis(thio)isocyanatomethyl)bicyclo(2.2.1)-heptane, bis((thio)isocyanatomethyl)cyclohexane, hexamethylene di(thio)isocyanate, dicyclohexylmethane-di(thio)isocyanate, bis((thio)isocyanatomethyl)-1,4-dithiane and xylylene-di(thio)isocyanate.

5. The process for producing a polythiourethane resin according to claim 1, wherein relative amounts of the polythiol compound having a functionality of two or greater and sulfur (S) are such that a ratio of amounts by mole equivalent of mercapto group in the polythiol compound having a functionality of two or greater to S/2 is in a range of 1:0.01 to 1:0.5.

6. The process for producing a polythiourethane resin according to claim 1, wherein the catalyst substantially inert to the compound having poly(thio)isocyanate groups is a phosphorus catalyst or an imidazole-based catalyst.

7. The process for producing a polythiourethane resin according to claim 6, wherein the phosphorus catalyst is at least one compound selected from compounds represented by the following general formula (I):

$$[R^1_4—P(O)]X \qquad (I)$$

wherein $R^1$ represents an alkyl group having 1 to 4 carbon atoms, X represents a halogen atom, and a plurality of $R^1$ may represent the same group or different groups.

8. The process for producing a polythiourethane resin according to claim 6, wherein the imidazole-based catalyst is at least one compound selected from compounds represented by the following general formula (II):

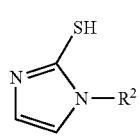

(II)

wherein $R^2$ represents an alkyl group having 1 to 4 carbon atoms.

9. The process for producing a polythiourethane resin according to claim 1, wherein degassing is conducted during the oligomer synthesis reaction or after the reaction is completed.

* * * * *